United States Patent Office 3,551,354
Patented Dec. 29, 1970

3,551,354
PROCESS FOR REDUCING THE LOSS DUE TO ABRASION OF ALUMINA EXTRUDATES AND OF EXTRUDED CATALYSTS BASED ON ALUMINA
Maarten Schutten, Amsterdam, Netherlands, assignor to Koninklijke Zwavelzuurfabrieken v/h Ketjen N.V., Amsterdam, Netherlands, a corporation of the Netherlands
No Drawing. Filed Oct. 2, 1968, Ser. No. 764,620
Claims priority, application Netherlands, Oct. 4, 1967, 6713461
Int. Cl. B01j *11/08, 11/22*
U.S. Cl. 252—466                    13 Claims

ABSTRACT OF THE DISCLOSURE

In order to reduce the loss or powdering of alumina extrudates, or of catalysts based thereon, due to abrasion, the alumina extrudates after being calcined are wetted with water and then subjected to attrition or a mutual rubbing action, as by tumbling in a rotated drum or by vibration against each other in a polishing machine. The attrition treatment may be followed by an acid leaching, whereupon the acid-leached extrudates are dried and calcined again.

SPECIFICATION

This invention relates generally to alumina extrudates and catalysts based thereon, and is particularly directed to a process for reducing the loss or powdering of such extrudates or catalysts based thereon when subjected to abrasion.

Alumina extrudates and the preparation thereof are known in the art. In the preparation of extrudates, an extrudable mix of alumina and water is pressed through the orifices of a die plate of an extrusion machine and the extrudate is cut or broken into lengths of the desired size, whereafter the extrudates are dried and generally calcined in order to obtain activated alumina suitable for use as a catalyst base material. Extruded platinum catalysts are prepared, for example, by impregnating the activated alumina extrudates with a solution of chloroplatinic acid in such amounts and concentrations that the final catalyst contains 0.3–0.6 wt. percent of platinum, and then drying and calcining the impregnated Pt-alumina extrudates. Catalysts containing other catalytically active metals on the extruded alumina base can be produced by such impregnation technique.

In use, such extruded catalyst may exhibit the disadvantageous characteristic of forming powder due to a relatively poor crushing strength and/or a relatively high loss due to abrasion. Extruded catalysts having an acceptable crushing strength may still give rise to the formation of a considerable amount of powder when used in the reactor, due to a high loss due to abrasion, that is, a low resistance to abrasion. Such powder increases the pressure drop through the catalyst bed in the reactor, may cause chanelling and sometimes leads to complete plugging of the catalyst bed. In regenerating the catalyst by burning off the coke, the powder may be taken away by the gas streams causing a loss of carrier material and of expensive metals such as, for example, platinum.

Several variations of the extrusion technique have been suggested to reduce the powdering of the extrudates while in use as catalyst carrier. Thus, it has been suggested to adjust the extrusion pressure to a certain favorable value found in practice, or to vary the moisture content of the extrudable mix, or to choose a certain extrusion temperature. Although it has been possible, in this way to produce extrudates of higher crushing strength that retain the desired catalytic properties, such as surface area, pore volume, pore sizes and bulk density, the loss due to abrasion has remained undesirably high.

It has now been found that the loss or powdering of activated alumina extrudates due to abrasion can be sharply reduced without any change in pore volume, pore diameter and density of the alumina by wetting the previously calcined alumina extrudates with water and subjecting the wetted extrudates to an attrition or mutual rubbing action for a certain time and then drying and calcining the treated extrudates. In this way it has been proven possible to reduce the loss or powdering due to abrasion from about 2 wt. percent to a value of 0.2 wt. percent and even less. Dry treating, that is, attrition of the calcined extrudates without wetting thereof, has no effect as will be illustrated in the examples. This leads to the theory (without being bound thereto) that it is not only the removing of sharp edges that accounts for the lower loss due to abrasion, but that a sort of surface hardening also takes place, which surface hardening does not occur in the case of the dry treatment.

As has already been indicated above, the alumina extrudates are calcined after the extrusion and before the attrition treatment according to this invention. This calcining step comprises heating to a temperature of between 450 and 850° C. for at least 1 hour.

The precalcined extrudates are wetted with water in an amount between 50 and 100% by weight calculated on the weight of the calcined extrudates.

The result obtained is almost independent of the type of apparatus used for the attrition, provided that between 0.2 and 2.0 wt. percent of alumina of the extrudate exterior is removed without otherwise damaging or disintegrating the extrudates. Good results are obtained by tumbling the extrudates in the rotating drum of a concrete mixer. A vibrational polishing machine or a sloping drum, which is slowly revolved, may also be conveniently used.

The results obtained with the described treatment are dependent on the treating time and the rotational speed or frequency of vibration. In a concrete mixer, a treating time of between 15 minutes and 30 minutes at 60 r.p.m. is usually sufficient for reaching the optimum result. The result is also more or less dependent on the extrudate length and diameter, the temperature and the amount of water with which the extrudates are wetted. As noted above, the amount of water is chosen between 50 and 100% by weight calculated on the weight of the precalcined extrudates. The exact amount of water depends on, among others, the pore volume of the extrudates. As much water is used as is required to entirely wet the extrudate exterior.

A vibrational treatment in a polishing machine, such as the Selecta Vibratofinish machine, gives the desired reduction in loss or powdering due to abrasion when conducted at a frequency between 20 and 1000 vibrations per minute.

After the attrition or mutual rubbing treatment, the extrudates are preferably washed with water in order to remove adhering powder. After this washing step the extrudates are dried and calcined. In another embodiment of the present invention the tumbled or vibrated extrudates are subjected to an acid treatment, preferably with a mineral acid, such as hydrochloric acid. It is known to treat alumina extrudates with an acid, for example, as disclosed in U.S. Pat. No. 3,038,865.

The following examples will illustrate the process of the invention, but are not intended to be limiting.

EXAMPLE 1

The extrudates to be treated according to this invention were of so-called gamma-type alumina prepared from gelled aluminum hydroxide which was calcined for at least 1 hour at a temperature between 450° C. and 850° C., as hereinafter indicated in detail.

The alumina gel used as the starting material for preparing the extrudates was obtained by the process disclosed in U.S. Reissue Pat. No. Re. 22,196, at page 1, left hand col., line 50, to right-hand col., line 49. The filter cake resulting from such process was broken into pieces and dried at 220° C. for 8 hours to increase the solids content to about 70 to 80 wt. percent. The dried pieces were milled in a "Bauermeister Turbo" mill to a mean particle size of less than 50 microns. The milled material was mixed with alumina sol, the latter being produced as in U.S. Reissue Pat. No. Re. 22,196, in sufficient proportions to provide the mix with a water content of about 50 wt. percent. This mix was extruded through the die plate of a "Buss" extender having orifices of 1.7 mm. diameter. The extrudates were broken to a mean extrudate length of about 5 mm. and dried at 250° C. for 13 hours. The dried extrudates were calcined at 760° C. for 1 hour to provide the gamma-type alumina.

The drum (diameter 1 meter) of a concrete mixer lined with acid-resistant material ("Ozuriet S3") was loaded with 60 kilograms of dry precalcined alumina extrudates formed as above. The extrudates were wetted with 42 liters of water. After this wetting the extrudates were tumbled by revolving the drum for 60 minutes at a speed of 60 r.p.m. After each 15 minutes a sample was taken from the drum content. In the samples removed after 15 minutes of tumbling, the amount of alumina removed was about 0.7 wt. percent and, in the samples removed after 60 minutes of tumbling, the amount of alumina removed was about 2.0 wt. percent. The removed samples were washed with water, dried at 220° C. for 8 hours and then calcined for 1 hour at 725° C. These calcined samples were tested for loss due to abrasion, as follows:

125 grams of the sample were sieved by hand using a 14 mesh sieve in order to remove fines. 100 grams of the sample retained on the 14 mesh sieve were transferred to a cylindrical drum with a diameter of 25 cm. and a height of 15 cm. and provided with a cover and an internal 5 cm. baffle. The cylinder was shaken for 30 minutes.

The content of the cylinder was sieved thereafter on a 20 mesh sieve in a Ro-Tap Testing Sieve Shaker for 10 minutes. The part of the sample retained on the sieve was weighed. The loss due to abrasion is 100 minus the weight of the part of the sample retained on the sieve. The results for the various samples are shown in Table A.

Table A

| Precalcined extrudates: | Loss due to abrasion in percent weight |
|---|---|
| Untreated | 1.6 |
| After tumbling for 15 minutes | 0.2 |
| After tumbling for 30 minutes | 0.2 |
| After tumbling for 45 minutes | 0.2 |
| After tumbling for 60 minutes | 0.2 |

It is apparent from the above that tumbling for 15 minutes is sufficient for improving the abrasion resistance of precalcined alumina extrudates which have been wet before the tumbling treatment.

EXAMPLE 2

10 kilograms of precalcined alumina extrudates prepared as described in Example 1 were placed in the drum of a vibrational polishing apparatus (Selecta Vibrato-finish machine) having a useful content of 15 liters, a length of 50 cm. and a diameter of 30 cm. The extrudates were vibrated in dry state for 60 minutes to effect removal of about 1.5 wt. percent of the alumina.

The loss due to abrasion of the starting material was 1.6 wt. percent and the loss due to abrasion of the product after the vibrational treatment was 1.5 wt. percent, as determined in Example 1. This establishes that a dry treatment has no effect.

EXAMPLE 3

The process of Example 2 was repeated, with the difference that the extrudates were wetted before the vibrational treatment with about 7 liters of water. The vibrational treatment, when continued for 30 minutes, effected the removal of about 0.9 wt. percent of alumina. The extrudates thus treated were calcined and tested for loss due to abrasion in the manner described in Example 1. The results are shown in Table B.

Table B

| Precalcined extrudates: | Loss due to abrasion in percent by weight |
|---|---|
| Untreated | 1.6 |
| After vibrating for 15 minutes | 0.3 |
| After vibrating for 30 minutes | 0.1 |
| After vibrating for 45 minutes | 0.1 |
| After vibrating for 60 minutes | 0.1 |

A vibrational treatment for a period between 15 and 30 minutes gives the optimum improvement in the abrasion resistance.

EXAMPLE 4

The process of Example 3 was repeated with the difference that in the same drum 20 kilograms of calcined alumina extrudates, wetted with 14 liters of water, were vibrated to effect removal of about 0.6 wt. percent of the alumina after 60 minutes.

The results of the abrasion test for various samples are shown in Table C.

Table C

| Precalcined extrudates: | Loss due to abrasion in percent by weight |
|---|---|
| Untreated | 1.8 |
| After vibrating for 15 minutes | 1.2 |
| After vibrating for 30 minutes | 0.8 |
| After vibrating for 45 minutes | 0.6 |
| After vibrating for 60 minutes | 0.3 |

It is seen from the foregoing that higher loading of the drum requires a longer vibration time to obtain the desired result.

EXAMPLE 5

A cylindrical drum with a length of 100 cm. and a diameter of 150 cm. was filled with 200 kilograms of precalcined alumina extrudates prepared as described in Example 1. The extrudates were wetted with 140 liters of water. The drum was slowly revolved for 60 minutes to effect the removal of about 0.7 wt. percent of the alumina from the extrudates. After each 15 minutes a sample was taken from the drum content. Each sample was dried for 8 hours at 220° C. and then calcined for 1 hour at 600° C. prior to being tested for loss due to abrasion in the manner described in Example 1.

The results are shown in Table D. After 60 minutes, the extrudates remaining in the drum were subjected to a 5% acid-leaching with an aqueous hydrochloric acid solution. The acid-leached extrudates were dried at 220° C. for 8 hours and calcined at 600° C. for 1 hour. These extrudates were also tested for loss due to abrasion.

150 kilograms of the acid-leached and calcined extrudates were soaked for 1 hour in 300 liters of an aqueous solution of chloro platinic acid containing 0.45 kilograms of platinum. The Pt-impregnated extrudates were dried at 220° C. for 8 hours and then calcined for 1 hour at 600° C. The finished catalyst containing 0.3 wt. percent Pt was also treated for loss due to abrasion.

Table D

| Precalcined extrudates: | Loss due to abrasion in percent by weight |
|---|---|
| Untreated | 1.9 |
| After tumbling for 15 minutes | 0.4 |
| After tumbling for 30 minutes | 0.3 |
| After tumbling for 45 minutes | 0.2 |
| After tumbling for 60 minutes | 0.2 |
| After 5% acid-leaching and calcining | 0.4 |
| Extrudates containing 0.3 wt. percent Pt | 0.3 |

From the above, it will be seen that, after an acid-leaching step and a further calcining, and also after Pt-impregnation, the loss due to abrasion remains at the low level obtained by the treatment according to the invention.

EXAMPLE 6

An amount of precalcined extrudates prepared as described in Example 1 was divided into two portions. The first portion was tested for loss or powdering due to abrasion. The test was repeated several times, every time by starting with the amount of extrudates retained on the 20 mesh sieve. The second portion was treated according to the process of Example 1 for 15 minutes and then tested for loss due to abrasion. Thereafter also this second portion was repeatedly tested for loss due to abrasion in the same way as described for the first portion. The results are shown in Table E.

TABLE E.—LOSS DUE TO ABRASION
[in weight percent]

| No. test | Untreated extrudates | Treated extrudates |
|---|---|---|
| 1 | 2.6 | 0.2 |
| 2 | 1.9 | 0.3 |
| 3 | 2.4 | 0.3 |
| 4 | 2.5 | 0.4 |
| 5 | 2.7 | 0.2 |
| 6 | 2.9 | 0.35 |
| 7 | 2.6 | 0.3 |
| 8 | 2.1 | 0.3 |
| 9 | 2.2 | 0.3 |
| 10 | 2.1 | 0.3 |

It might be expected that untreated extrudates would show a lower loss due to abrasion in the 2nd and further tests as, in the first test, the sharp edges have been removed from the extrudates. However, the above figures make it clear that this is not the case, whereas the treated extrudates show low losses due to abrasion in all tests. These figures illustrate that, in the process of the invention, it is not only removal of sharp edges that accounts for the reduction of the loss due to abrasion, but that in some way a hardening of the extrudate surface also takes place.

EXAMPLE 7

As described at col. 2, lines 19–27 of U.S. Pat. No. 3,038,865, 25 kg. of platinated extrudates (0.3 wt. percent Pt.) were obtained by impregnating activated alumina extrudates with an aqueous solution of platinum hydrogenchloride, followed by drying and calcining. Such platinated extrudates were treated in a concrete mixer as described in Example 1, but without wetting.

The results of the loss due to abrasion tests are shown in Table F.

Table F

| Pt-alumina-extrudates: | Loss due to abrasion in wt. percent |
|---|---|
| Untreated | 8.4 |
| After tumbling for ½ hour | 6.3 |
| After tumbling for 1 hour | 5.3 |
| After tumbling for 1½ hours | 6.0 |

After tumbling for 1½ hours 3 wt. percent of the catalyst had been removed. Thus, dry tumbling does not result in reduction of the loss due to abrasion.

EXAMPLE 8

The experiment of Example 7 was repeated with another 25 kg. Pt-alumina extrudates, but now the extrudates were wetted with water. After tumbling for half an hour to remove about 1.1 wt. percent of the alumina, the extrudates were dried superficially by passing warm air over the extrudates. The extrudates were further dried at 220° C. for 8 hours on enamelled plates and then calcined for 1 hour at 600° C.

Two samples were tested for loss due to abrasion, and the results of such tests were 0.2 wt. percent and 0.3 wt. percent, respectively.

This example further illustrates that finished catalysts based on activated alumina extrudates can also be successfully treated according to the process of the present invention. In practice, the procedure of this example is usually not recommended as the treatment may cause an undesirable loss of active metals.

EXAMPLE 9

25 kilograms of calcined alumina extrudates prepared as described in Example 1 were treated in a concrete mixer as described in that example, for half an hour with a resulting removal of about 0.9 wt. percent of alumina. The loss due to abrasion was reduced by this treatment from 2.7 to 0.3 wt. percent. The specific surface area and the pore volume of the untreated and treated material were determined, with the results tabulated below:

| | Before treatment | After treatment |
|---|---|---|
| Surface area in m.$^2$/g | 171 | 168 |
| Pore volume in ml./g | 0.49 | 0.49 |

EXAMPLE 10

50 kilograms of calcined alumina extrudates prepared as described in Example 1 were treated in a concrete mixer as described in that example for 45 minutes with a resulting removal of about 1.0 wt. percent of alumina. The loss due to abrasion was reduced by this treatment from 1.5 to 0.4 wt. percent. The apparent bulk density (ABD) and the crushing strength of the untreated and treated material were determined. The ABD before and after the treatment was the same, the crushing strength before the treatment was 1.9 kg./mm. and after the treatment was 2.1 kg./mm.

EXAMPLE 11

60 kilograms of dry precalcined alumina extrudates prepared in the manner described in Example 1 were treated according to the procedure of Example 1 for 15 minutes with a resulting removal of about 0.7 wt. percent of alumina. The treated extrudates were washed with water, dried at 220° C. for 8 hours on enamelled plates and calcined in an oven at 725° C. for 1 hour. Thereafter, the extrudates were impregnated with 0.6 wt. percent of platinum by soaking in an aqueous solution of chloro platinic acid, dried at 220° C. for 8 hours and calcined at 600° C. for 1 hour. In Table G the results of the abrasion test for the extrudates after each calcination are shown.

Table G

| Extrudates: | Loss due to abrasion in wt. percent |
|---|---|
| Untreated | 1.7 |
| After tumbling for 15 minutes | 0.2 |
| After Pt-impregnation | 0.2 |

What is claimed is:

1. Process for reducing the powdering by abrasion of alumina extrudates, comprising calcining the alumina extrudates after the extrusion thereof by heating said extrudates at a temperature between 450 and 850° C. for at least 1 hour, wetting the calcined extrudates with water in an amount between substantially 50 and 100%, by weight, based on the weight of said calcined extrudates, subjecting the extrudates while thus wetted to attrition so as to frictionally remove therefrom between substantially 0.2 and 2.0%, by weight, of the alumina, and then drying and calcining the extrudates.

2. Process according to claim 1, in which the alumina extrudates are impregnated with an aqueous solution of a platinum compound prior to the first mentioned calcining of the extrudates to provide platinum-on-alumina catalysts.

3. Process according to claim 1, in which, following the last mentioned calcining, the alumina extrudates are impregnated with an aqueous solution of a platinum compound, whereupon the thus impregnated extrudates are further dried and calcined to provide platinum-on-alumina catalysts.

4. Process according to claim 1, in which said attrition of the wetted extrudates is effected by tumbling the latter in a drum rotated at a speed between substantially 60 and 80 r.p.m.

5. Process according to claim 4, in which said tumbling of the wetted extrudates is continued for at least approximately 15 minutes.

6. Process according to claim 1, in which said attrition of the wetted extrudates is effected by vibrating the latter in a closed container at a frequency between substantially 20 and 1000 vibrations per minute.

7. Process according to claim 1, in which, after said attrition of the wetted extrudates, the latter are subjected to acid leaching prior to the last mentioned drying and calcining of the extrudates.

8. Process according to claim 7, in which said acid leaching is effected with a mineral acid.

9. Process according to claim 7, in which said acid leaching is continued until between substantially 3 to 5%, by weight, of the alumina has been dissolved.

10. Alumina extrudates produced by the process of claim 1.

11. Alumina extrudates produced by the process of claim 7.

12. Platinum-on-alumina catalysts produced by the process of claim 2.

13. Platinum-on-alumina catalysts produced by the process of claim 3.

References Cited

UNITED STATES PATENTS

| | | | |
|---|---|---|---|
| 2,862,278 | 12/1958 | Engel | 25—156 |
| 3,038,865 | 6/1962 | Abrahams | 252—466 |
| 2,348,780 | 5/1944 | Blaker | 252—236 |

DANIEL E. WYMAN, Primary Examiner

P. M. FRENCH, Assistant Examiner

U.S. Cl. X.R.

252—463